(12) United States Patent
Bryant

(10) Patent No.: US 6,856,476 B2
(45) Date of Patent: Feb. 15, 2005

(54) RETAINER PLATE SWITCHING MECHANISM FOR OPTICAL COMPONENT

(75) Inventor: Mark A. Bryant, Roanoke, VA (US)

(73) Assignee: Demitsu Kosan Co., Ltd. (JP)

( * ) Notice: Subject to any disclaimer, the term of this patent is extended or adjusted under 35 U.S.C. 154(b) by 745 days.

(21) Appl. No.: 09/794,248

(22) Filed: Feb. 28, 2001

(65) Prior Publication Data

US 2002/0118469 A1 Aug. 29, 2002

(51) Int. Cl.[7] .............................. G02B 7/02; G02B 3/00
(52) U.S. Cl. ...................... 359/822; 359/810; 359/809; 359/813
(58) Field of Search .................. 359/810, 809, 359/813, 896, 815, 819, 822, 630, 632

(56) References Cited

U.S. PATENT DOCUMENTS

| | | | | | |
|---|---|---|---|---|---|
| 5,285,224 | A | * | 2/1994 | Sims | 351/235 |
| 5,596,378 | A | * | 1/1997 | Kelman | 351/233 |
| 5,790,907 | A | * | 8/1998 | Reibl | 396/348 |

* cited by examiner

Primary Examiner—Timothy Thompson
(74) Attorney, Agent, or Firm—Parkhurst & Wendel, L.L.P.

(57) ABSTRACT

A switching mechanism in an optical device for switching an optical component between defined positions. A retainer plate, which captures the optical component in a housing, includes detents for maintaining the optical component in a defined position, as well as a mechanical interference portion between detents for resisting the movement of the optical component between defined positions.

20 Claims, 7 Drawing Sheets

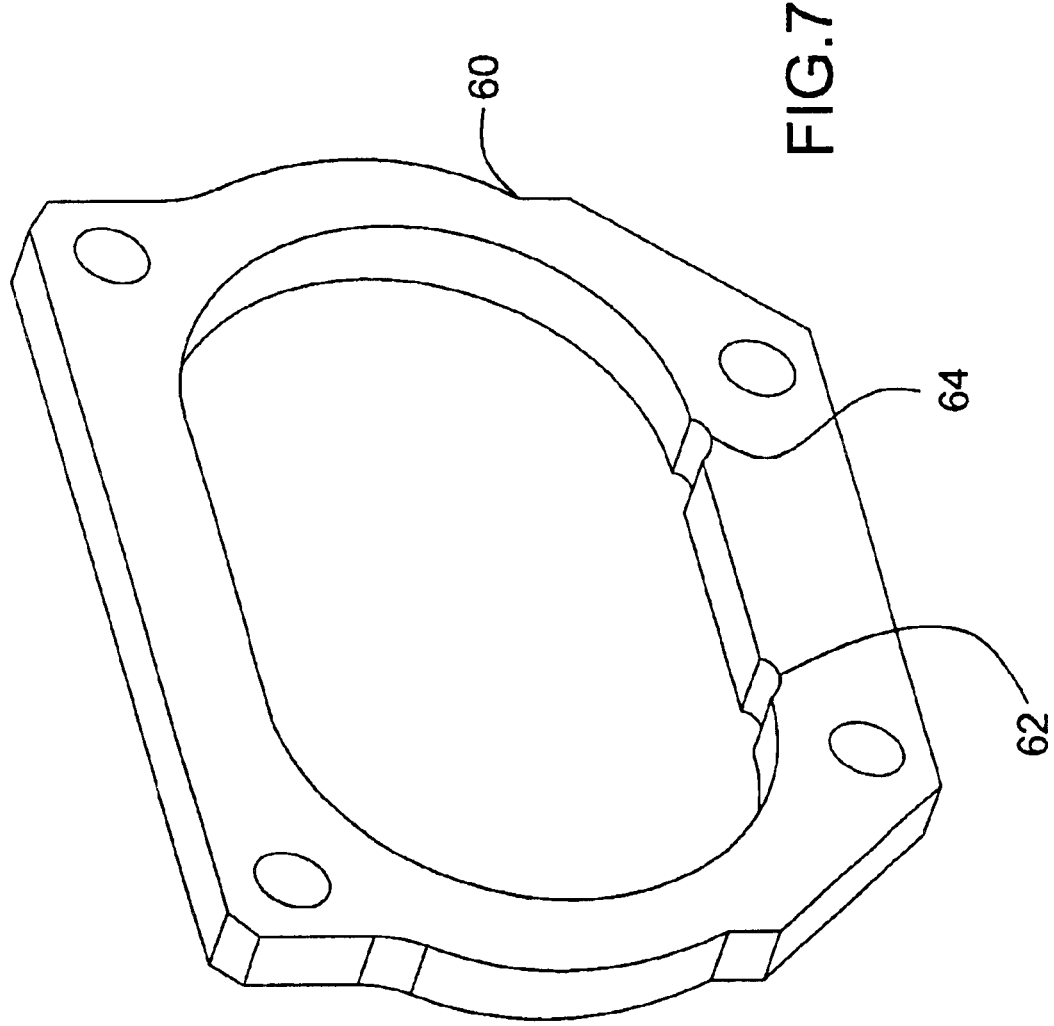

US 6,856,476 B2

RETAINER PLATE SWITCHING MECHANISM FOR OPTICAL COMPONENT

FIELD OF THE INVENTION

The present invention is directed to a switching mechanism in an optical device for switching an optical component between defined positions.

BACKGROUND OF THE INVENTION

In the implementation of an optical device, it is frequently necessary to switch an optical component between defined positions. In such cases, it is desirable for the optical component to be firmly held in the defined positions, but to be freely moveable therebetween without the exertion of undue force.

Although not so limited, the present invention finds particular applicability to a night vision device having an infrared light emitting diode (LED) for providing illumination. The LED is located in an LED port in a housing, and it is desirable to be able to use it either as a spot light or as a flood light.

For use as a spot light, a lens assembly is provided, which is moved over the LED port to a defined position to accomplish focussing of the light from the LED. On the other hand, for use as a flood light, the lens assembly is moved to another defined position where it does not interact with the light from the LED, allowing the light to spread to its full extent.

In a known prior art design, the lens assembly could "stick" in either position, and it would take a great deal of force to move it towards the other position, so that it could slam into the other side. The design employed two small protrusions (nubs) in the upper wall of a large slot in the front of the binocular housing. The large slot served as a track for the lens assembly to travel in. Specifically, the lens assembly has a cylindrical member projecting from a flange with two flats that slide snugly in the large slot. Centered within the flats of the flange there is a small cylindrical groove. This small cylindrical groove provides an area for the nubs to engage with, creating a detent. The flange is captured in the large slot of the binocular housing by way of a retainer plate. The close spacing and tight tolerances of the design were part of the reason why the nubs held-on to the small grooves. The geometry of the grooves also lent themselves to difficult release, making for an abrupt transition from detented-to-free-to-detented again positions.

SUMMARY OF THE INVENTION

It is thus an object of the present invention to provide a device for switching an optical component between defined positions, where the optical component does not stick, and can be moved from position to position with a comfortable amount of force.

In accordance with the present invention this object is accomplished by providing a switching device for switching an optical component between defined positions, comprising, a housing in which the optical component is slidably mounted for sliding between the defined positions, and a retainer plate in front of the housing for capturing the optical component in the housing, wherein the retainer plate has a slot defined by a slot wall through which the optical component passes, and wherein the slot wall has detents for defining the defined positions and for maintaining the optical component in a selected one of the defined positions.

BRIEF DESCRIPTION OF THE DRAWINGS

The invention will be better understood by referring to the accompanying drawings, wherein:

FIG. 7 shows a further embodiment of a retainer plate which may be used in the invention.

DETAILED DESCRIPTION OF PREFERRED EMBODIMENTS

Figure 1:
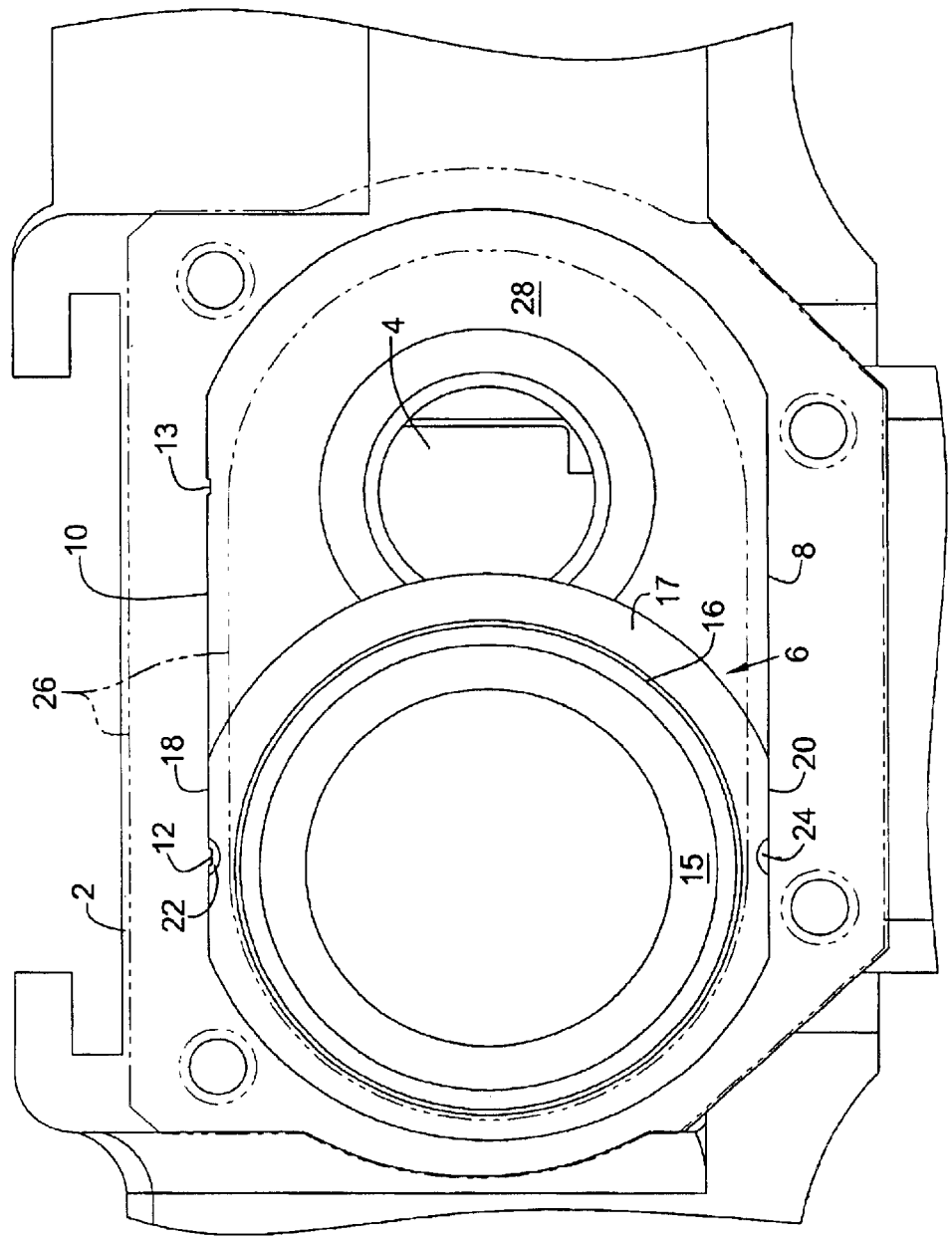
FIG. 1 shows a prior art switching mechanism in a night vision device.

Referring to FIG. 1, a prior art switching device for a night vision apparatus is shown. Device housing 2, which in the illustrative embodiment is a F5050 binocular housing, has an infrared (IR) light emitting diode (LED) port 4. In this port there is an IR LED (not shown) or other light source, the purpose of which is to illuminate the scene to be viewed with IR radiation which is, the type of radiation to which the night vision device responds for viewing the scene.

As is well known, the night vision device itself is comprised of an image intensifier tube for responding to low levels of light (including IR), converting the light from photons to electrons with a cathode, multiplying the electrons with a microchannel plate, and converting the multiplied electrons to visible light with a phosphor screen.

It is desired to provide the viewer with an option, which is to use the LED as either a flood light or a spot light. In this regard, a lens assembly 6 is provided, as well as a switching mechanism, the subject of the present invention, for switching the lens assembly between flood and spot positions. In the position shown in FIG. 1, the lens assembly is out of the way of the LED port, and the light from the LED is able to spread out to its fullest extent, thus serving as a flood light. In order to create a spot light, the lens assembly is moved to the right in the figure until it covers the LED port, and the lens focusses the light from the LED into a tight beam.

Referring again to the prior art of FIG. 1, housing 2 has a slot 8 having a slot wall 10. On the top of the slot wall 10, there are two detent nubs 12 and 13. It is noted that the terms "top" and "bottom" are used herein in the sense that they would be understood in reference to FIGS. 1 and 2. The lens assembly is comprised of optics 14, cylindrical member 16, and a flange 17, of greater diameter than the cylindrical member, but having flats 18 and 20 on the top and bottom for sliding against the slot wall 8.

The flats have small cylindrical grooves 22 and 24 (only 22 used in FIG. 1 embodiment), for interacting with the nubs 12 and 13, to form detents. Thus, in the position shown in FIG. 1, the lens assembly is captured in the left position in that the nub 12 is inserted in groove 22. The upper flat is flush against the upper part of the slot wall, while the lower flat is flush against the lower part of the slot wall. Additionally, there is a retainer plate 26 placed over the flange 17 to maintain the lens assembly in the housing, which retainer plate has a slot 28 through which the lens assembly passes.

In order to move the lens assembly to the spot position, it has been found that a considerable amount of force must be exerted on the lens assembly, to the extent that it may jam against the other side of the slot. This is partly because of the specific detent arrangement used and partly because in the prior art design tolerances between the slot wall and the flats which slide along it are very tight.

Figure 2:
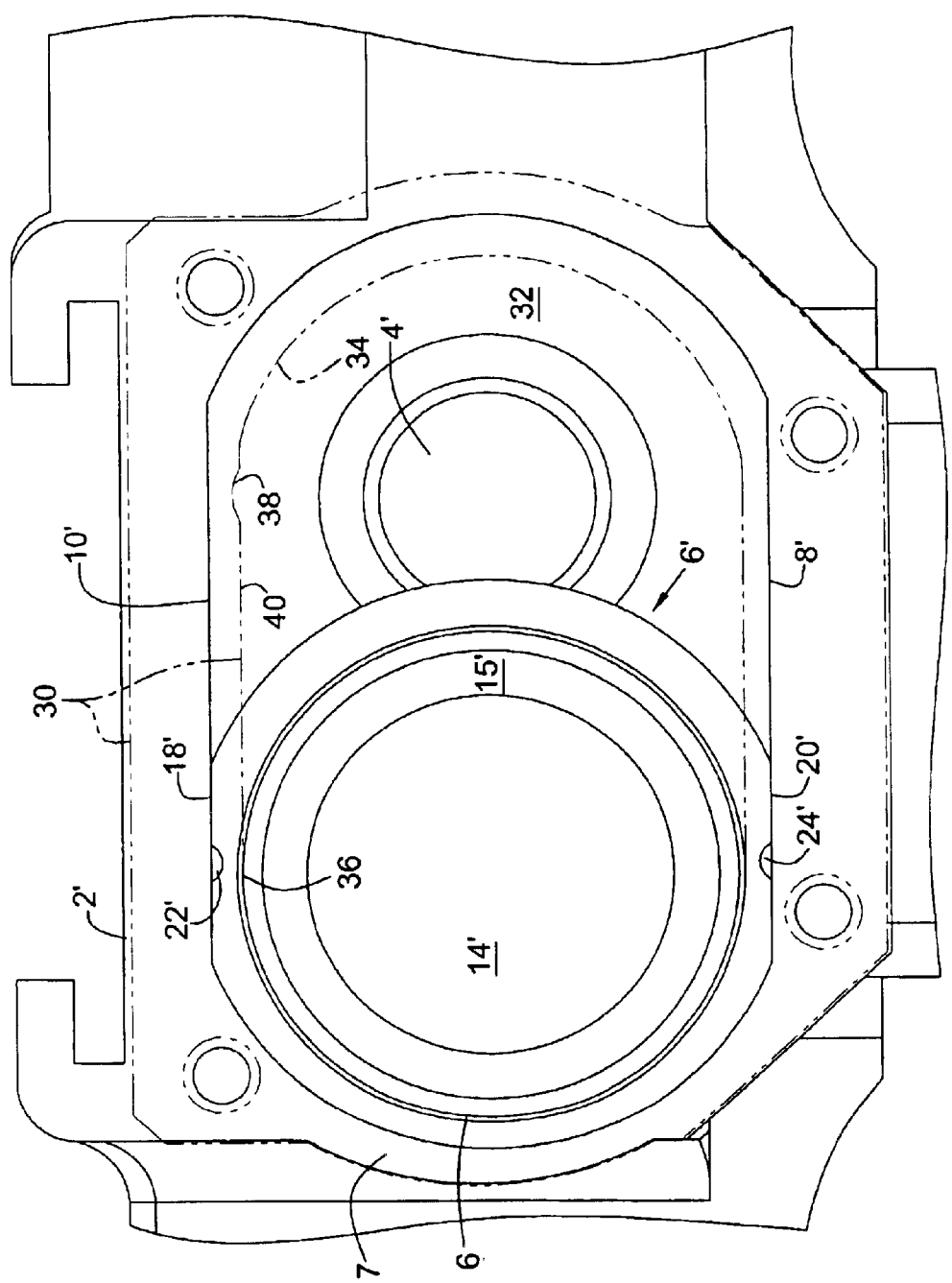
FIG. 2 shows an embodiment of the switching mechanism of the present invention.
Figure 3:
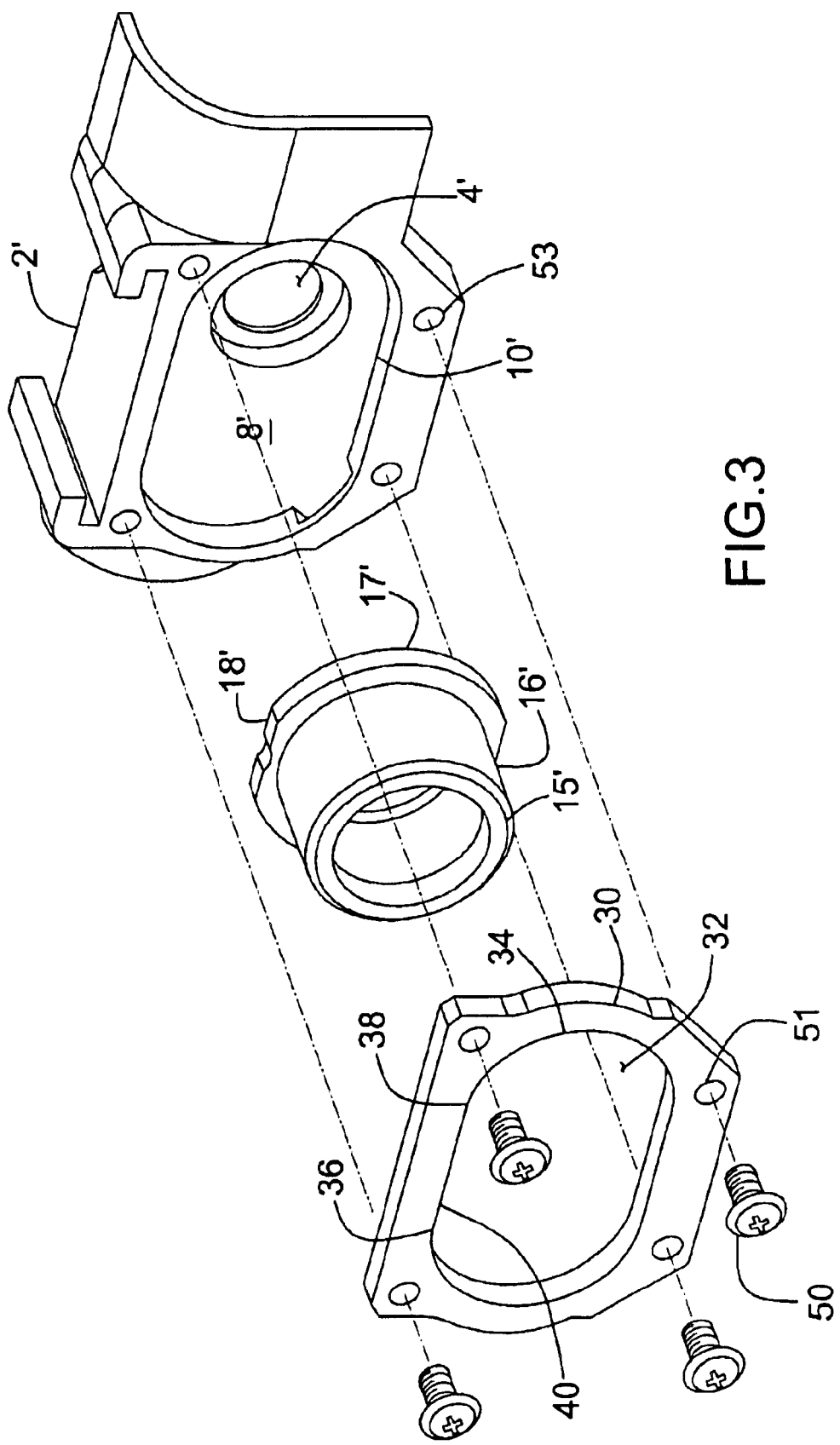
FIG. 3 is an exploded perspective view of an embodiment of the invention.
Figure 4:
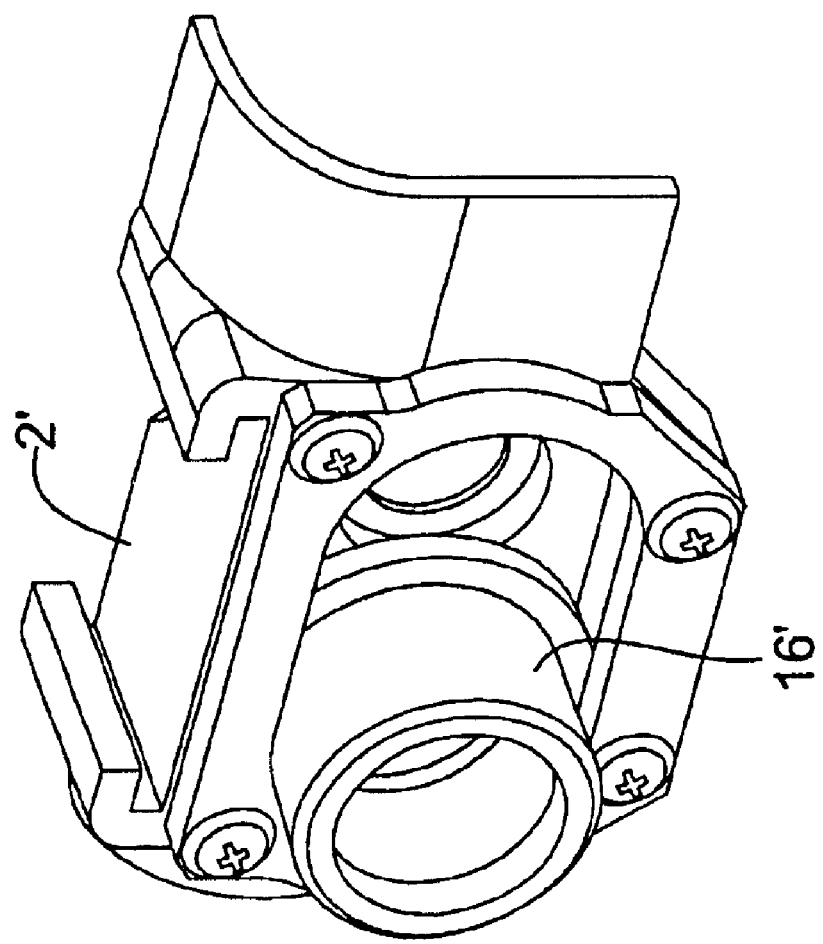
FIG. 4 is an assembled perspective view of an embodiment of the invention wherein the lens assembly is in the "flood" position.

In accordance with the present invention, such problems are obviated. Referring to FIGS. 2, 3 and 4, a switching device in accordance with an embodiment of the present invention is shown, and for the sake of clarity, like parts utilize the same reference numerals as in FIG. 1.

Referring to FIG. 2, it will be seen that the nubs 12 and 13 have been omitted (grooves 22' and 24' are present only to retain the exact part, but serve no function, and can be omitted also). In the new design, the retainer plate 30 in addition to retaining the lens assembly in the housing, also has detents 36 and 38 for maintaining the lens assembly in a selected one of the two defined positions. Thus, retainer plate 30 has a slot 32 defined by a slot wall 34, and slot wall 34 is provided with the detents. Between the detents is a relatively straight portion 40 of the retainer slot wall, which acts as a mechanical interference surface, resisting the movement of the lens assembly between detents. In the preferred embodiment, the detents are comprised of shallow scallops. The scallops are strategically located between the curved end portions of the retainer slot wall and the straight mechanical interference portion. The curved end portions of the slot wall have a shape similar to that of the cylindrical member 17', so that this latter member fits snugly against the slot wall in both the spot and flood positions.

Thus, in the embodiment shown in FIG. 2, it is the scalloped areas (36, 38) of the retainer which maintains the lens assembly in either the flood or spot positions by compressing the top of cylindrical member 17'. This force is resisted down below by the lower portion of housing slot wall 10' pushing upwardly on the lower flange flat 20'.

In accordance with the switching device of the present invention, switching of the lens assembly from flood to spot positions and vice versa is accomplished smoothly. The lens assembly has a clean "snap" feel as it is moved into a detent, and it can be switched to the other position without excessive force. The retainer plate and optical assembly may be made of plastic, while the housing of the night vision device may be made of metal. As the lens assembly is moved between positions, the plastic to plastic contact on top and the plastic to metal contact below provide a comfortable sliding feel.

It is noted that the housing slot may be opened up more in the embodiment of FIG. 2 as compared with the embodiment of FIG. 1. This provides for smoother movement of the lens assembly. However, if desired, the tighter tolerances of the FIG. 1 embodiment may be retained in the FIG. 2 embodiment, for example, if it is desired to use the same housing part, since the detents of the retainer plate compress the optical assembly down out of the way of any nubs which may be present.

FIG. 3 is an exploded view of the embodiment shown in FIG. 2. Also shown in FIG. 3 are the four mounting screws 50 which are used to mount the retainer plate to the housing by insertion into mounting holes 51 of the retainer plate, and into corresponding tapped holes 53 of the housing.

FIG. 4 is an assembled view of the embodiment shown in FIGS. 2 and 3. It is seen that the lens assembly is maintained in the flood position in the figure by a detent in the retainer plate pressing on the top of the cylindrical member and the bottom flat of the flange rests on the lower slot wall of the housing.

Figure 5:
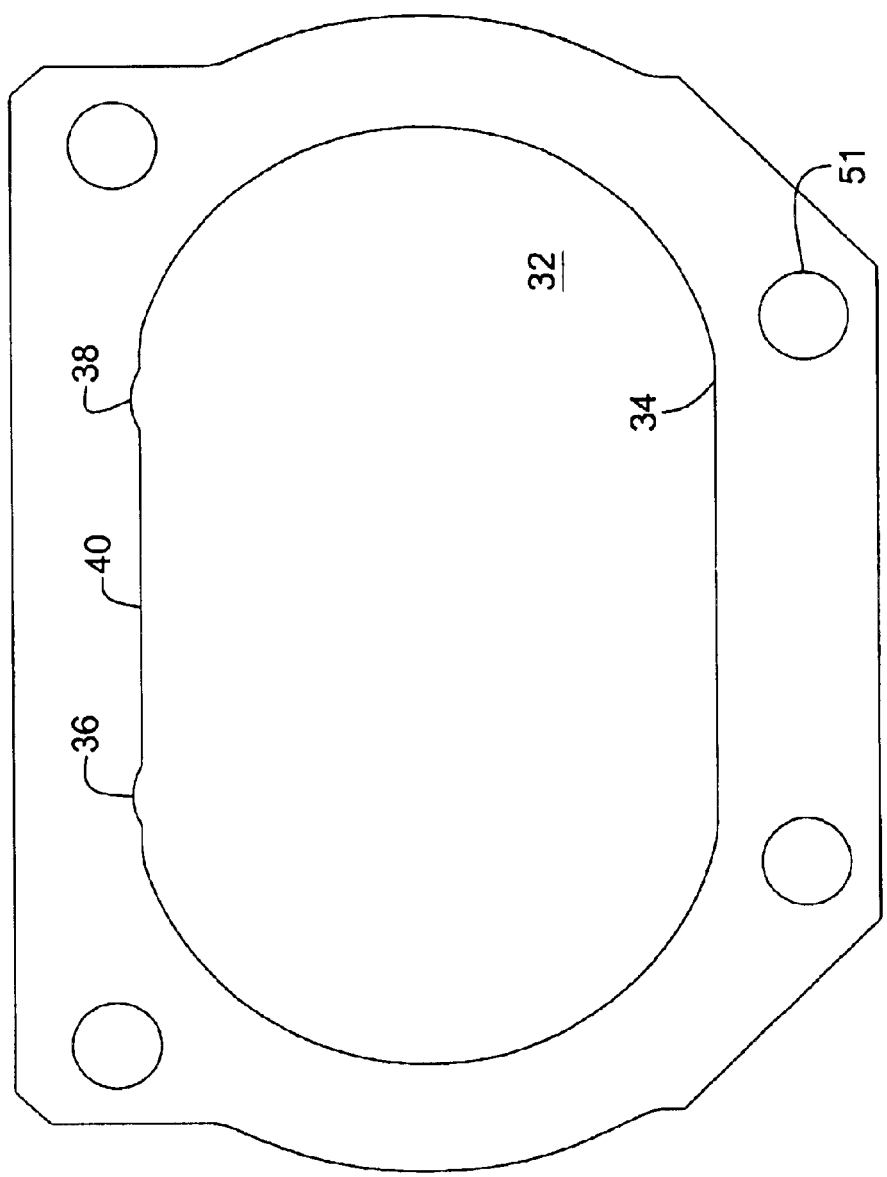
FIG. 5 is a plan view of an embodiment of a retainer plate which may be used in the invention.

FIG. 5 is a plan view of a preferred embodiment of the retainer plate, and clearly shows the configuration of the slot wall including scallops 36 and 38 and the mechanical interference portion 40.

Figure 6:
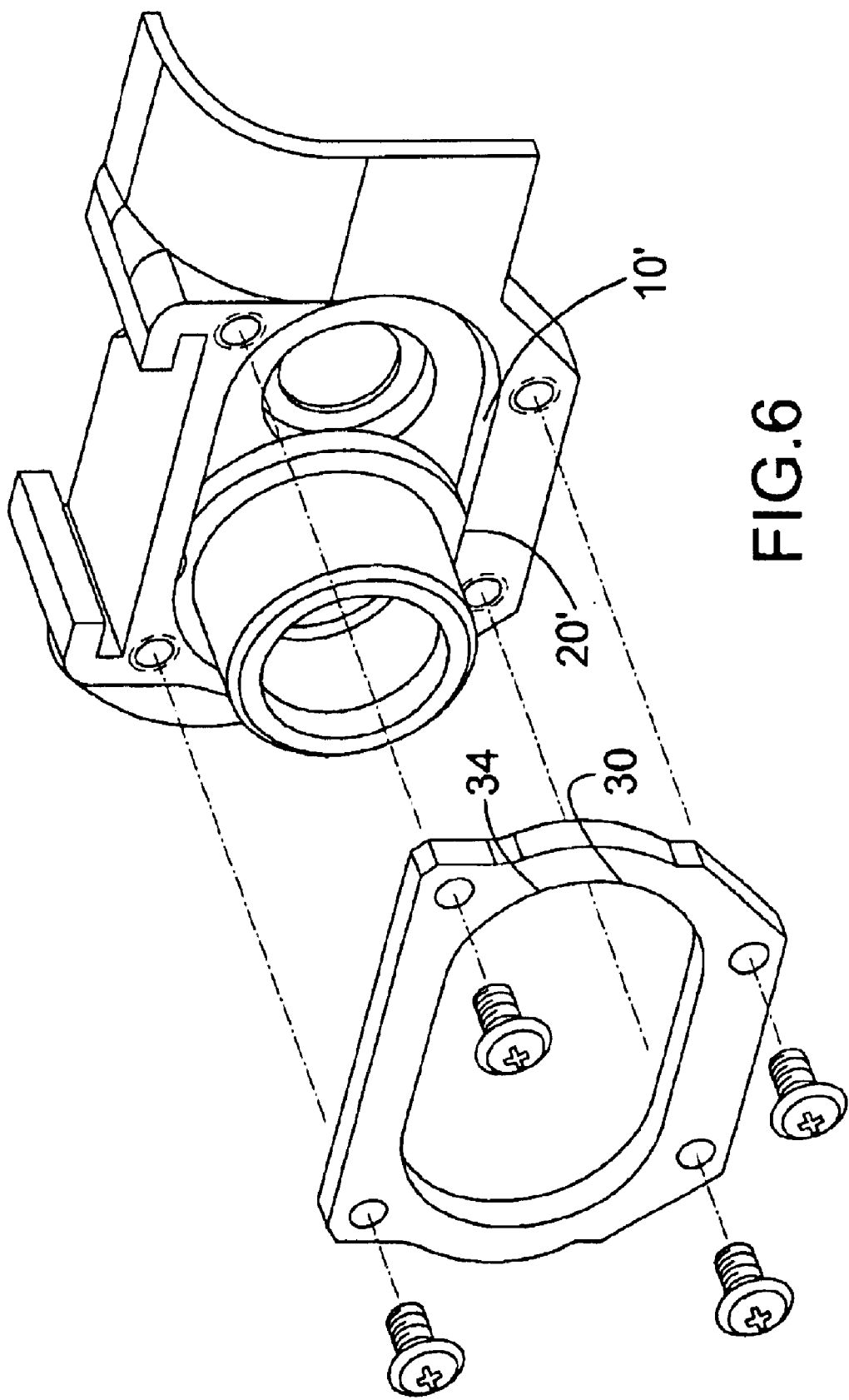
FIG. 6 is a partially exploded perspective view, which shows the seating of the lower flange flat on the housing slot wall.

FIG. 6 is a semi-exploded view of the device and more clearly shows how the lower flange flat 20' is seated on the lower housing slot wall 10'.

FIG. 7 shows a further embodiment of a retainer plate 60, wherein scallops 62 and 64 are located in the bottom of the slot wall rather than the top.

It should be appreciated that while the invention has been illustrated in connection with a switching device for a lens assembly for a night vision apparatus, in accordance with its broader aspects it is applicable to switching any optical component between positions in any type of optical apparatus. In such regard, there can be more than two positions between which switching is effected and not be limited to linear reciprocation but possibly of a radial delineation also.

It should thus be appreciated that while only a preferred embodiment has been detailed herein, variations will occur to those skilled in the art, and the invention to be covered is defined in the claims which are appended hereto.

I claim:

1. An optical apparatus including a device which enables movement of a first optical component to defined positions, comprising, a housing mounting a second optical component with which the first optical component operatively interacts when in a first position, the housing having a relatively large slot, the first optical component having a cylindrical member, which extends from a flange having a relatively larger diameter than that of the cylindrical member, the first optical component being positioned so that the flange is in the relatively large slot of the housing, and the slot and the flange being dimensioned so that the flange is slidable in them slot, and a retainer plate positioned over the flange and secured to the housing so as to retain the first optical component in the housing, the retainer plate having a relatively small slot through which the cylindrical member passes, the slot of the retainer plate being bounded by a wall which includes a plurality of detents, each of which exerts force on the cylindrical member when it is positioned in a respective detent.

2. The optical apparatus claim 1 wherein the slot wall of the retainer plate has a mechanical interference portion between the detents which contacts and resists the cylindrical member when it is moved between the defined positions.

3. The optical apparatus of claim 2 wherein the detents comprise scallops in the slot wall of the retainer plate.

4. The optical apparatus of claim 3 wherein the slot wall of the retainer plate has curved end portions at respective slot ends, and wherein the scallops and mechanical interference portion of the slot wall are between such slot ends.

5. The optical apparatus of claim 4 wherein the cylindrical member has the shape of a right circular cylinder.

6. The optical apparatus of claim 5 wherein the slot wall of the retainer slot has top and bottom portions extending between respective end portions, and wherein the scallops and mechanical interference portion are in the top portion.

7. The optical apparatus of claim 6 wherein the relatively large slot of the housing has a slot comprised of curved portions at respective ends and relatively straight top and bottom portions therebetween.

8. The optical apparatus of claim 7 wherein the flange has a cross section which is circular except at the top and bottom where there are top and bottom flats respectively for sliding in the relatively straight top and bottom portions of the housing slot.

9. The optical apparatus of claim 8 wherein the detents in the slot wall of the retainer plate create a downward force on the cylindrical member which is resisted by the bottom flat of the flange pressing against the bottom portion of the housing slot.

10. The optical apparatus of claim 1 wherein the optical apparatus is a night vision apparatus and wherein the first optical component is a lens assembly and the second optical component is a light emitting diode.

11. The optical apparatus of claim 10 wherein the wall of the retainer plate has a mechanical interference portion between detents which contacts and resists the cylindrical member when it is moved between the defined positions.

12. In a night vision device having an infrared LED port out of which radiation is emitted, a mechanism for switching a lens assembly between a spot position where it covers the LED port and a flood position where it does not cover the LED port, comprising, a housing including the LED port, which has a relatively large slot, the lens assembly including a cylindrical member which extends from a flange having a relatively larger diameter than that of the cylindrical member, the lens assembly being positioned so that the flange is in the relatively large slot of the housing and the slot and flange being dimesioned so that the flange is slidable in the slot, and a retainer plate positioned over the flange and secured to the housing so as to retain the lens assembly in the housing, the retainer plate having a relatively small slot through which the cylindrical member passes, the slot being bounded by a slot wall which has curved end portions at respective ends, the slot wall including two scallops between the end portions for defining the spot and flood positions for the lens assembly, each scallop exerting a force on the cylindrical member when it is disposed in that scallop, and a mechanical interference portion between the two scallops which contacts and resists the cylindrical member when it is moved between the spot and flood positions.

13. The mechanism of claim 12 wherein the relatively large slot of the housing has a housing slot boundary wall comprised of curved portions at respective ends and relatively straight top and bottom portions between the curved portions, the flange having a cross section which is circular except at the top and bottom where there are top and bottom flats respectively for sliding in the relatively straight top and bottom portions of the housing slot wall, the downward force created by a scallop on the cylindrical member being resisted by the bottom flat of the flange pressing against the bottom portion of the housing slot wall.

14. In an optical apparatus, a switching device for switching an optical component between defined positions, comprising, a housing in which the optical component is slidably mounted for sliding between the defined positions, and a retainer plate in front of the housing for capturing the optical component in the housing, wherein the retainer plate has a slot defined by a slot wall through which the optical component passes and wherein there are detents in the form of scallops in the slot wall for defining the defined positions and for maintaining the optical component in a selected one of the defined positions.

15. The switching device of claim 14 wherein the optical component includes a cylindrical member, and wherein the slot wall has curved end portions at opposing ends of the slot to accommodate the cylindrical member in the defined positions.

16. The switching device of claim 15 wherein the slot wall has top and bottom portions connecting the end portions, wherein the detents are in one of the top and bottom portions, wherein the slot wall further includes a relatively straight mechanical interference portion between the detents for resisting the cylindrical member as it is moved between the detents, and wherein the detents are located between the curved end portions and the relatively straight mechanical interference portion.

17. The switching device of claim 16 wherein the cylindrical member projects from a flange having two flats, and wherein the housing has a housing slot in which the flange is slidably mounted for movement, the housing slot being defined by a slot wall having substantially straight portions for accommodating the flats as the optical component slides between the defined positions.

18. The switching device of claim 17 wherein the retainer plate overlies the flange.

19. The switching device of claim 14 wherein the optical apparatus is a night vision apparatus having an LED port, and the optical component is a lens assembly which is switchable between a first defined position wherein the lens assembly covers the LED port and a second defined position where the lens assembly does not cover the LED port.

20. The switching device of claim 18 wherein the optical apparatus is a night vision apparatus having an LED port, and the optical component is a lens assembly which is switchable between a first defined position wherein the lens assembly covers the LED port and a second defined position where the lens assembly does not cover the LED port.

* * * * *

UNITED STATES PATENT AND TRADEMARK OFFICE
CERTIFICATE OF CORRECTION

PATENT NO. : 6,856,476 B2  Page 1 of 1
DATED : February 15, 2005
INVENTOR(S) : Bryant It is certified that error appears in the above-identified patent and that said Letters Patent is hereby corrected as shown below:

Title page,
Item [73], Assignee, should read -- ITT Manufacturing Enterprises, Inc. --
Item [74], *Attorney, Agent, or Firm*, Edell, Shapiro & Finnan, LLC --

Signed and Sealed this

Twelfth Day of July, 2005

JON W. DUDAS
*Director of the United States Patent and Trademark Office*